US00RE33881E

United States Patent [19]

Courtois et al.

[11] E Patent Number: Re. 33,881

[45] Reissued Date of Patent: Apr. 14, 1992

[54] APPARATUS FOR LIFTING CONCRETE PANELS

[75] Inventors: Peter D. Courtois, Centerville, Ohio; Robert E. Truitt, Carson, Calif.

[73] Assignee: Dayton Superior Corporation, Miamisburg, Ohio

[21] Appl. No.: 607,205

[22] Filed: Oct. 30, 1990

Related U.S. Patent Documents

Reissue of:

[64] Patent No.: 4,700,979
Issued: Oct. 20, 1987
Appl. No.: 920,103
Filed: Oct. 16, 1986

U.S. Applications:

[63] Continuation of Ser. No. 408,865, Aug. 28, 1989, abandoned.

[51] Int. Cl.[5] ..... B66C 1/36; B66C 1/66

[52] U.S. Cl. ..... 294/89; 294/82.34

[58] Field of Search .... 294/82.24, 82.27, 82.31-82.35, 294/89; 24/598.7, 599.3, 601.6; 52/122.1, 124.2, 125.2, 125.4

[56] References Cited

U.S. PATENT DOCUMENTS 4,173,367 11/1979 Haeussler ..... 294/89 X
4,368,914 1/1983 Truitt et al. ..... 294/89 X

FOREIGN PATENT DOCUMENTS 2552387 5/1977 Fed. Rep. of Germany ..... 294/89
2610195 9/1977 Fed. Rep. of Germany ..... 294/89

*Primary Examiner*—Johnny D. Cherry
*Attorney, Agent, or Firm*—Biebel & French

[57] ABSTRACT

An apparatus for lifting precast concrete panels includes a lifting body having a forward portion adapted to engage in an anchor head, a latch yoke pivotally connected to a rearward end of the lifting body and including a safety latch cooperating with the forward portion *of the lifting body* to lock an anchor head to the forward portion, a release yoke pivotally attached to the lifting body *for movement between locked and release positions* and including a cam [roller for urging] *effective during movement of the release yoke to its release position to cause* the latch yoke to pivot to a release portion, and a lifting bail pivotally attached to the forward portion. The [lifting body] *release yoke* includes a safety pin block extending [upwardly] from a rearward portion thereof adjacent [to] the rearward end of the latch yoke. The latch yoke and safety pin block include bores which are in registry with each other when the apparatus is oriented to a locked position. A safety pin is inserted into the bores and prevents relative pivotal movement between the latch yoke and [lifting body] *release yoke*, and is removable from the bore by a lanyard which is pulled by a worker.

7 Claims, 2 Drawing Sheets

APPARATUS FOR LIFTING CONCRETE PANELS

Matter enclosed in heavy brackets [ ] appears in the original patent but forms no part of this reissue specification; matter printed in italics indicates the additions made by reissue.

*REFERENCE TO RELATED APPLICATIONS*

*This is a continuation of application Ser. No. 408,865, filed Aug. 28, 1989, now abandoned, which is a reissue of U.S. Pat. No. 4,700,979, issued on Oct. 20, 1987.*

BACKGROUND OF THE INVENTION

The present invention relates to hardware for lifting precast concrete panels by engagement with the heads of anchors recessed within the panels, and more particularly, to lifting hardware which includes a safety pin for preventing the unintentional disengagement of the hardware from the anchor head.

In order to facilitate the handling and transportation of precast concrete panels, the panels are cast with anchor pins having flared heads that are positioned within hemispherical recesses. Many types of lifting hardware have been developed to engage the recessed anchor heads, and such hardware typically includes a connecting member with a slot for engaging the anchor head, and a loop or lifting bail which is easily connected to the cable of a hoist by a hook or shackle.

One example of such lifting hardware is disclosed in Truitt et al. U.S. Pat. No. 4,368,914. That lifting apparatus consists of a lifting body having a forward portion, which includes a spoon-type connecting member and a bail, a release yoke which receives and is pivotally connected to a rearward portion of the lifting body, and a latch yoke pivotally connected to the rearward portion of the lifting body. The latch yoke includes a safety latch which cooperates with the connecting member to retain an anchor head within the slot of the connecting member. The release yoke receives a lanyard which is pulled to release the apparatus from the anchor head.

The lifting body rearward portion, release yoke, and latch yoke are all oriented substantially parallel to each other when the hardware is in the locked position and engages an anchor head. When the lanyard is pulled by a user, the release yoke pivots relative to the lifting body, which causes the release yoke and lifting body to assume a release position in which they are angled with respect to each other, and causes the latch yoke to pivot so that the safety latch is displaced away from the connecting member. At this time, the slot is pivoted away from the anchor head so that the lifting hardware is able to swing free of the concrete panel.

In order to prevent the inadvertent release of the lifting hardware from the concrete panel, the aforementioned device has been modified to provide the safety latch with an upwardly extending portion which is parallel to a boss on the release yoke. A safety pin is inserted through bores formed in the safety latch and base to prevent relative movement between the release yoke and safety latch. The safety pin is attached to the release lanyard so that a downward pull on the lanyard causes the safety pin to be removed from the bores prior to the lanyard becoming sufficiently taut to begin pivoting the release yoke. That device is illustrated in FIG. 1 of the drawings and is labelled "PRIOR ART".

A disadvantage with that design results from the loose dimensional tolerances of the release yoke, latch yoke, and lifting body, and the loose locational tolerances of the pivot connections between the yokes and the lifting body, which are a consequence of the typically low-cost casting and machining processes used to make the device. These loose tolerances frequently provide sufficient play between the components of that device such that the safety latch can be displaced sufficiently, when the apparatus is in the locked position, to enable the connecting member to slide away from its engagement with the anchor head. Consequently, the lifting hardware may disengage from the anchor head prior to the apparatus being pivoted to the release position.

Accordingly, there is a need for an apparatus for lifting concrete panels which includes a safety mechanism that prevents the inadvertent separation of the lifting hardware from the anchor head. Furthermore, such a safety device should not add measurably to the overall cost of the lifting apparatus and should be capable of being disengaged by a tugging action on the release lanyard by a user, so that the safety device can be disengaged by a person at a location remote from the lifting apparatus.

SUMMARY OF THE INVENTION

The present invention is an apparatus for lifting concrete panels which includes a safety device that provides a more secure engagement between the lifting apparatus and anchor head that prior art devices, despite the existence of normal out-of-tolerance conditions in the dimensioning of the components of the apparatus, as well as in the location of the pivot and cam connections. The safety device of the present invention is used in combination with a lifting apparatus of the type which includes a lifting body having a forward portion adapted to fit within an anchor recess and engage on anchor head, a latch yoke pivotally connected to the rearward end of the lifting body and including a safety latch which cooperates with the forward portion to capture an anchor head within the forward portion, and a release yoke which is pivotally attached to the lifting body.

The safety device includes a safety pin block which is attached to the rearward end of the release yoke and extends upwardly perpendicularly to the rearward portion of the yoke. The rearward end of the safety yoke and the safety pin block include upwardly-angled bores which are aligned when the lifting apparatus is in the locked position. A safety pin is inserted into the bores and the connection prevents relative movement between the latch yoke and the release yoke.

It has been found that, by positioning such a safety pin mechanism at the rearward end of the lifting apparatus, the safety mechanism is much less influenced by variations in dimensional and locational tolerances that may exist with the other components of the lifting apparatus. Consequently, the lifting apparatus of the present invention provides a secure locking arrangement and is unlikely to release from a locked position with an engaged anchor head inadvertently.

In the preferred embodiment of the invention, the safety pin bores are oriented to angle rearwardly and outwardly from the lifting apparatus so that the safety pin within the bores points in the direction of a person who would be manipulating the lanyard to disengage the safety mechanism and acuate the release yoke. Consequently, a tug on the lanyard results in a pull on the safety pin which is coaxial, rather than at an angle to the axis of the safety pin, so that the pin is drawn outwardly without being urged against the sides of the bores.

Also in the preferred embodiment, the bore in the safety pin block includes a pair of detents which engage an annular groove formed in the safety pin, so that the safety pin is less likely to fall out of the bores inadvertently when the lifting apparatus is positioned adjacent to a vertical edge of a concrete panel.

Accordingly, it is an object of the present invention to provide a lifting apparatus which includes a safety device for preventing the inadvertent disengagement of the lifting apparatus from an anchor head; a lifting apparatus having a safety device which does not add measurably to the overall cost of the apparatus; a lifting apparatus having a safety device whose reliability is virtually unaffected by normal variations in tolerances of the components of the apparatus; and a lifting apparatus in which the safety device can be disengaged relatively easily by a person located away from the apparatus.

Other objects and advantages of the present invention will be apparent from the following description, the accompanying drawings, and the appended claims.

DETAILED DESCRIPTION OF THE PREFERRED EMBODIMENT

Figure 3:
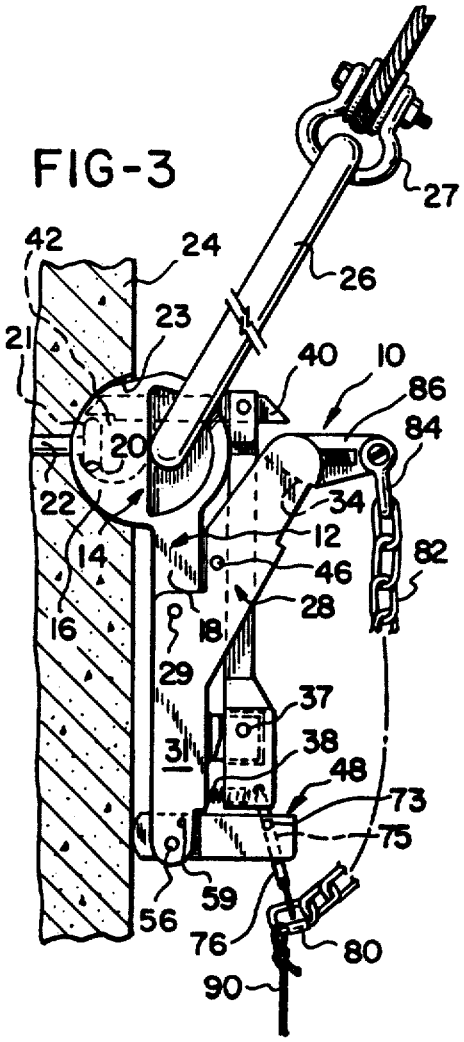
PRIOR ART FIG-3
FIG. 3 is a side elevation of the lifting apparatus of FIG. 2, shown attached to an anchor in a locked position.
Figure 2:
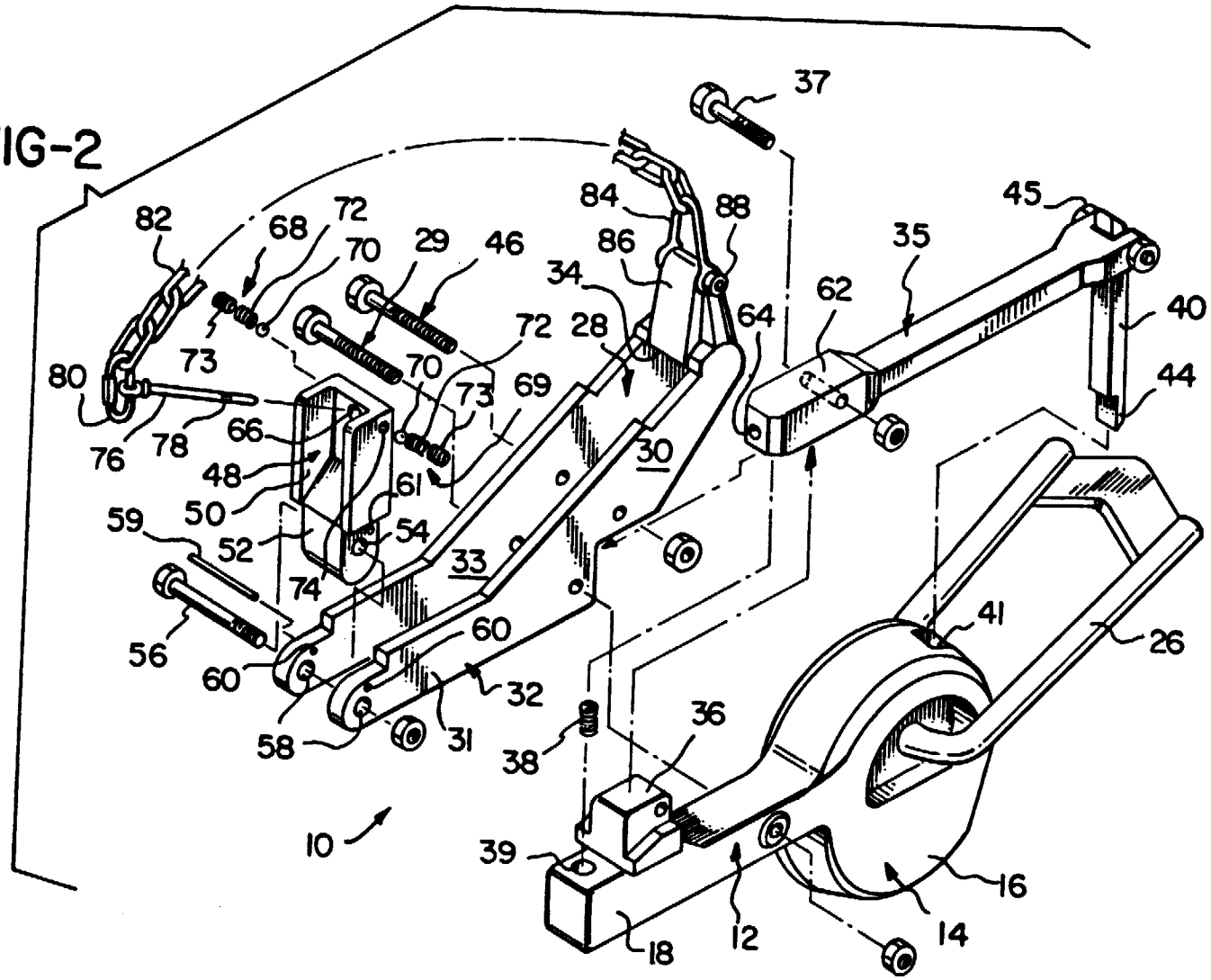
FIG. 2 is an exploded, perspective view of the lifting apparatus of the present invention.

As shown in FIGS. 2 and 3, the lifting apparatus of the present invention, generally designated 10, includes a lifting body 12 having a forward portion 14 which includes a spoon-shaped connecting member 16 and a rearward portion 18. The connecting member 16 includes a slot 20 shaped to receive the head 21 of an anchor 22. The connecting member 16 is circular in cross section and is sized to fit within the hemispherical recess 23 formed in a present concrete panel 24. A bail 26 is pivotally connected to the forward portion 14 above the spoon-shaped connecting member 16, and is sized to receive a shackle 27 of a hoist.

A release yoke 28 is connected to the lifting body 12 by a pivot connection comprising a nut and bolt combination 29 and includes an upwardly extending forward portion 30 and a rearward portion 31, consisting of a pair of spaced apart legs 32, 33. The forward portion 30 of the release yoke 28 includes a transverse bridge 34.

An oblong latch yoke 35 is connected to an upwardly extending boss 36, located on the rearward portion of the lifting body 12, by a pivot connection consisting of a hex head cap screw and nut combination 37. The rearward end of the latch yoke 35 includes a recess (not shown) that receives the upper end of a coil spring 38 that is seated within a recess 39 formed in the rearward portion 18 of the lifting body 12. The forward end of the latch yoke 35 is in the shape of a clevis and is sized to receive a safety latch 40.

The safety latch 40 extends downwardly through an opening 41 in the forward portion 14 and into a void 42 within the connecting member 16. The bottom tip 44 of the safety latch 40 is shaped to receive the anchor head 21 so that the anchor head is retained within the slot 20 when the lifting apparatus 10 is in the configuration shown in FIG. 3. The safety latch 40 is retained on the latch yoke 35 by a nut and bolt combination 45 and, due to the shape of the clevis end of the latch yoke, is prevented from pivoting relative to the latch yoke so that it remains substantially perpendicular to it.

The release yoke 28 includes a bearing surface in the form of a nut and bolt combination 46 that is positioned directly below the shank of the latch yoke 35 when the lifting apparatus 10 is in the configuration shown in FIG. 3.

A safety pin block 48 includes an upper channel-shaped portion 50 and a lower knuckle 52. The knuckle 52 includes a transverse bore 54 aligned with holes 58 formed in the legs 32, 33 of the rear portion 31. The holes receive a nut and bolt combination 56. The safety pin block 48 is oriented substantially perpendicularly to the rearward portion 31 and is maintained in that position by a roll pin 59 that extends through aligned holes 60 in legs 32, 33 and hole 61 in knuckle 52.

The rearward end 62 of the latch yoke 35 includes a first bore 64 which, as shown in FIG. 3, is angled upwardly from the body of the latch yoke. The upper channel portion 50 of the safety pin block 48 includes a second bore 66 which is similarly angled and includes a pair of detent assemblies 68, 69. The detent assemblies 68, 69 each include a stainless steel detent ball 70 which is urged into the second bore 66 by a coil spring 72. The spring 72 and ball 70 are retained by a set screw 73 within detent holes 74 (one of which is shown) opening into the bore 66. When the apparatus 10 is oriented in a locked position (shown in FIG. 3), the first and second bores 64, 66 are coaxial so as to form a combined bore 75.

A safety pin 76 is shaped to be inserted in the combined bore 75 and includes a circumferential groove 78 which is located along its shank to receive the end of the detent ball 70, thereby securing the safety pin within the bore. The safety pin is attached to a ring 80 which is attached to the end of a chain 82. The forward end of the chain 82 is attached to a loop 84 that is pivotally attached to a boss 86 by a nut and bolt combination 88. Boss 86 extends upwardly from the shoulder of the release yoke 28.

A lanyard 90 is attached to the ring 80. The chain 82 is of sufficient length to hang loosely when the safety pin 76 is inserted into the combined bore 75 at the rearward end of the apparatus 10. Consequently, a pull of the lanyard 90 will first act to remove the safety pin 76 from the bore 75 before exerting a tensile force through the chain 82 to the release yoke 28.

The operation of the lifting apparatus 10 is as follows. When attached to an anchor head 21 recessed within a concrete panel 24, the lifting apparatus 10 assumes the locked position shown in FIG. 3. The lifting body 12, rearward portion 31 of release yoke 28, and latch yoke 35 are all oriented substantially parallel to each other. The safety latch 40 of the latch yoke 35 retains the anchor head 21 within the slot 20 of the connection member 16, and the latch yoke is prevented from pivoting about 37 by the resilient force exerted by the spring 38, as well as by engagement of the bridge 34 with the top of the release yoke.

Furthermore, the release yoke 28 is prevented from pivoting about 29 relative to the lifting body 12 by the engagement of the safety pin 76 in the bores 64, 66, so that the rearward portion 31 of the release yoke 28 is positively connected to the rearward end 62 of the latch yoke 35. This connection also prevents the release yoke 28 from pivoting relative to the lifting body 12. The locking engagement provided by the safety pin 76 is unaffected by variations in dimensional tolerances of the lifting body 12, release yoke 28, or latch yoke 35. Nor is the locking engagement affected by variations in locational tolerances of the pivot connections 29 and 37.

When it is desired to release the apparatus 10 from the anchor 22, the lanyard 90 is pulled by the operator. The initial result of the tightening of the lanyard 90 is that the safety pin 76 is removed from the bore 75, which allows the release yoke 28 to move relative to the latch yoke 35 and pivot relative to the lifting body 12. Continued downward force on the lanyard 90 causes the release yoke 28 to pivot about 29 and rotate the spoon-shaped connecting member 16 such that the anchor head 21 is removed from engagement with the slot 20.

Figure 4:
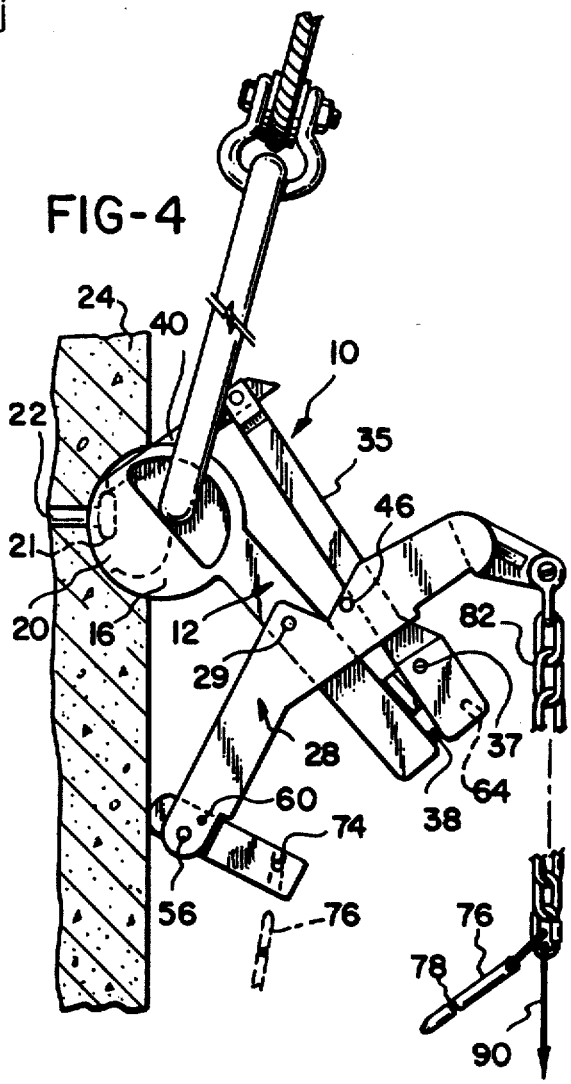
FIG. 4 is a side elevation of the lifting apparatus of FIG. 3, shown actuated to a release position.

At the same time, the nut and bolt bearing 46 [urges] *acts as a cam* against the underside of the latch yoke 35, causing it to pivot relative to the lifting body 12, thereby raising the safety latch 40 out of the void 42 to allow the anchor head 21 to *disengage* completely [disengage] from the slot 20. The pivotal movement of the release yoke 28 will continue until the apparatus 10 assumes the configuration shown in FIG. 4, which is the release position. At that time, the entire apparatus will swing free of the panel 24.

Figure 1:
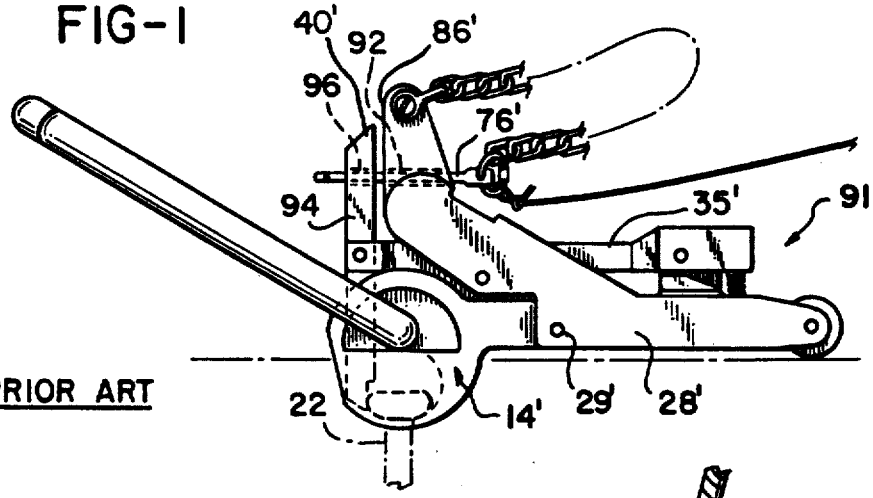
FIG. 1 is a side elevation showing a prior art lifting apparatus.

In contrast, the prior art lifting apparatus, generally designated 91 and shown in FIG. 1, includes a safety pin 76' which extends through a bore 92 formed in the boss 86' of the release yoke 28'. The safety latch 40' includes an upper extension 94 that includes a second bore 96, positioned to be in registry with the first bore 92 when the device 91 is in the locked position. Accordingly, the safety pin 76' extends through both bores 92, 96 and prevents relative movement between the release yoke 28' and the latch yoke 35'.

Such a design, in which the positive connection between the latch yoke 35' and the release yoke 28' is located forwardly of the pivot point 29', and directly above the forward portion 14', has been found to be less reliable in preventing the inadvertent release of the apparatus 91 from an anchor 22. This is believed to result from the positive engagement at that location being more susceptible to variations in dimensional tolerances of the components of the apparatus 91, as well as locational tolerances of the pivot connections.

While the form of apparatus herein described constitutes a preferred embodiment of the invention, it is to be understood that the invention is not limited to this precise form of apparatus, and that changes may be made therein without departing from the scope of the invention.

What is claimed is:

1. In an apparatus for lifting precast concrete panels of the type including a lifting body having a forward portion adapted to fit within an anchor recess and engage an anchor head, a latch yoke [pivotally connected] *having a pivot connection* to a rearward end of said lifting body *for movement between locked and release positions* and including a safety latch *at a forward end thereof* cooperating with said forward portion *of said lifting body* to lock an anchor head to said forward portion when said latch yoke is pivoted to [a] *said* locked position, a release yoke pivotally attached to said lifting body *for movement between locked and release positions with respect to said latch yoke* and including *cam* means [for urging] *effective during movement of said release yoke from said locked position to said release position thereof to cause* said latch yoke to pivot to [a] *said* release position *thereof* wherein said safety latch is displaced from said forward portion, and a lifting bail pivotally attached to said forward portion, the improvement comprising:

*locking* means extending between a rearward end of said latch yoke and [said] *a* rearward end of said [lifting body] *release yoke*, and positioned rearwardly of said [urging] *cam* means and said pivot [connections] *connection* between said lifting body[,] *and* latch yoke, [and release yoke, for] preventing pivotal movement of said latch yoke relative to said lifting body when said [latch] *release* yoke is in said locked position *thereof*, thereby locking said apparatus to said anchor head.

2. The apparatus of claim 1 wherein said [pivot preventing] *locking* means includes a pair of bores formed in said latch yoke and said [lifting body] *release yoke*, said bores being positioned to be aligned with each other when said [latch yoke is] *yoke are* in said locked position *thereof*; and a safety pin sized to be removably inserted into said bores, thereby providing a rigid connection between said latch yoke and said lifting body and preventing relative pivotal movement therebetween.

3. The apparatus as claim 2 wherein said release yoke includes a safety pin block extending [outwardly] therefrom [adjacent to] *toward* said rearward end of said latch yoke and including one of said bores.

4. The apparatus of claim 3 wherein said safety pin block bore includes detent means for retaining said safety pin therein.

5. The apparatus of claim 4 wherein said bores, when aligned together form a combined bore extending [rearwardly and angled outwardly from said apparatus] *through said safety pin block into said latch yoke in a direction inclined toward said lifting body*.

6. The apparatus of claim 5 wherein said safety pin block is fixed relative to [a remainder of] said release yoke.

7. In an apparatus for lifting precast concrete panels of the type including a lifting body having a forward portion adapted to fit within an anchor recess and engage an anchor head, a latch yoke *having a rearward end* attached to a rearward portion of said body at a first pivot connection *for movement between locked and release positions* and including a safety latch cooperating with said forward portion *of said body* to lock an anchor head to said forward portion when said latch yoke is pivoted to [a] *said* locked position, a release yoke connected at a midportion thereof [of] *to* said rearward portion of said body at a second pivot connection forward of said first pivot connection *for movement between locked and release positions* and including cam means, located forward of said second pivot connection, [for urging] *and effective during movement of said release yoke from said locked position to said release position thereof to cause* said latch yoke to pivot to [a] *said* release portion *thereof* wherein said safety latch is displaced from said forward portion, and a lifting bail pivotally attached to said forward portion *of said lifting body*, the improvement comprising:

said latch yoke including a first bore in [a] *said* rearward end thereof;

said [lifting body] *release yoke* including a safety pin block extending [upwardly from a rearward end of said rearward portion] *therefrom on the opposite side of said second pivot connection from said cam means toward said latch yoke* and including a second bore[,] located to be aligned with said first bore when said [apparatus] *release yoke* is in said locked position[,] and forming with said first bore a combined bore [angled rearwardly and upwardly from said apparatus] *extending into said yokes in a direction inclined toward said lifting body*;

a safety pin sized [to slidably engage] *for slidable engagement within* said combined bore, thereby preventing relative pivotal movement between said latch yoke and said lifting body; and detent means for releasably retaining said safety pin within said combined bore.

* * * * *